United States Patent
Flaig

(10) Patent No.: US 8,342,493 B2
(45) Date of Patent: Jan. 1, 2013

(54) ANTI-DRIFT TURNING ROLL SYSTEM

(75) Inventor: Robert T. Flaig, Holland, NY (US)

(73) Assignee: Koike Aronson, Inc., Arcade, NY (US)

( * ) Notice: Subject to any disclaimer, the term of this patent is extended or adjusted under 35 U.S.C. 154(b) by 417 days.

(21) Appl. No.: 12/616,500

(22) Filed: Nov. 11, 2009

(65) Prior Publication Data

US 2011/0109030 A1    May 12, 2011

(51) Int. Cl.
| | |
|---|---|
| F27B 7/00 | (2006.01) |
| F16C 19/50 | (2006.01) |
| B23Q 1/25 | (2006.01) |
| B23Q 3/00 | (2006.01) |

(52) U.S. Cl. ............... 269/55; 269/289 R; 269/289 MR; 384/549; 432/103

(58) Field of Classification Search .................. 269/55, 269/281.1, 289 R, 289 MR, 291, 57, 58, 269/903, 143–148; 29/243.5–244; 384/549, 384/583; 414/433, 758, 778
See application file for complete search history.

(56) References Cited

U.S. PATENT DOCUMENTS

| | | | | |
|---|---|---|---|---|
| 760,127 | A * | 5/1904 | Bode | 101/339 |
| 940,261 | A * | 11/1909 | Swan | 70/452 |
| 2,865,690 | A | 12/1958 | Risse | |
| 3,008,439 | A | 11/1961 | Stanley | |
| 3,899,943 | A * | 8/1975 | Schaller | 82/130 |
| 4,135,417 | A * | 1/1979 | Weck | 82/130 |
| 4,176,998 | A * | 12/1979 | Wittenrich | 414/433 |
| 4,407,621 | A | 10/1983 | Hansen | |
| 5,415,541 | A * | 5/1995 | Kastingschafer et al. | 432/103 |
| 5,462,370 | A * | 10/1995 | Kastingschafer et al. | 384/549 |
| 5,613,782 | A * | 3/1997 | Korting et al. | 384/549 |
| 2007/0215730 | A1 * | 9/2007 | Martin et al. | 241/117 |

FOREIGN PATENT DOCUMENTS

| | | |
|---|---|---|
| FR | 2537247 A1 * | 12/1982 |
| FR | 2 537 247 A1 | 6/1984 |
| GB | 760127 | 10/1956 |
| GB | 940261 | 10/1963 |
| GB | 1034201 | 6/1966 |

(Continued)

OTHER PUBLICATIONS

WIPO, International Search Report and Written Opinion of the International Searching Authority for corresponding application PCT/US2010/056093, Jan. 26, 2011.

(Continued)

*Primary Examiner* — Monica Carter
*Assistant Examiner* — Seahee Yoon
(74) *Attorney, Agent, or Firm* — Hodgson Russ LLP

(57) ABSTRACT

A turning roll system for rotating a cylindrical workpiece about a workpiece axis comprises a pair of idler rollers cooperating with a pair of drive rollers to support the workpiece. To oppose axial drift of the workpiece, each idler roller is rotatably journalled on a respective idler axle such that the axis of rotation of the idler roller is oriented obliquely relative to a pivot axis of the idler axle. The idler axles may be pivoted about their respective pivot axes to adjust the orientation of the idler roller axes relative to the workpiece to introduce an axially directed force component acting on the workpiece to counter axial drift. Pivoting of the idler axles may be automatically controlled based on a signal generated by a drift sensor arranged to detect axial drift of the workpiece.

21 Claims, 5 Drawing Sheets

FOREIGN PATENT DOCUMENTS

GB          2106810          4/1983

OTHER PUBLICATIONS

Koike Aronson, Inc., "High Performance Turning Rolls", product brochure, Aug. 20, 2003, U.S.A.

F. Bode & Sons Ltd., "Anti-Creep Devcies", product flyer, Oct. 20, 2004, United Kingdom.

Pemamek Oy, "Pema News", customer newsletter, Jan. 2005, p. 3, Finland.

Pemamek Oy, "Pema News", customer newsletter, Sep. 2008, p. 12, Finland.

The International Bureau of WIPO, International Preliminary Report on Patentability in International Application No. PCT/US2010/056093, mailed May 15, 2012.

* cited by examiner

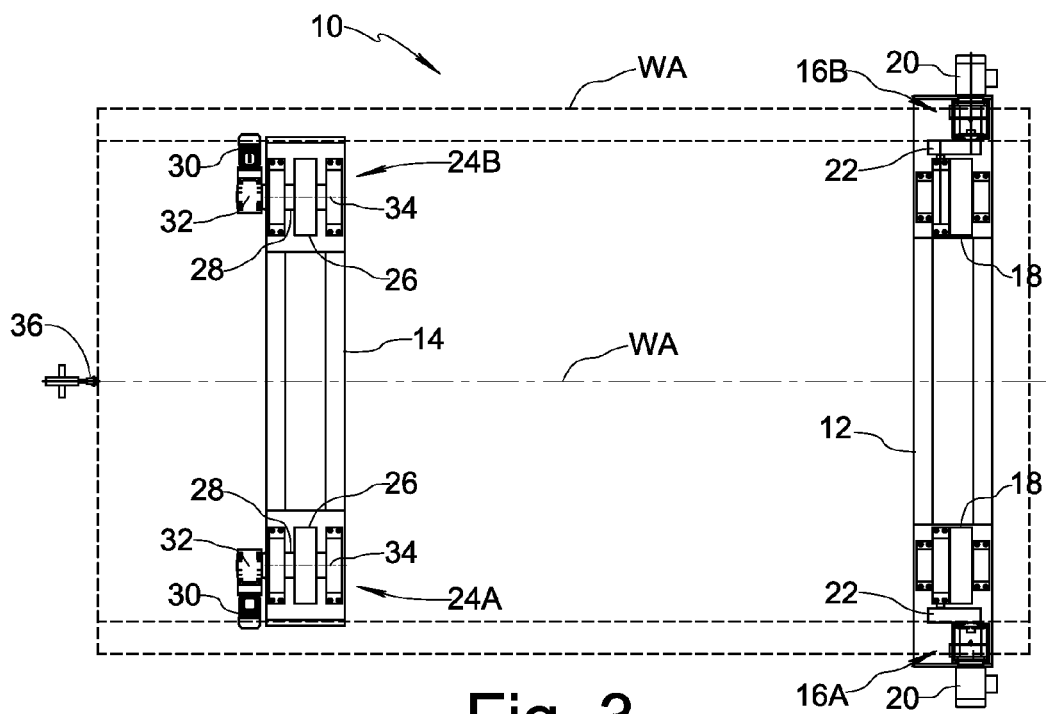
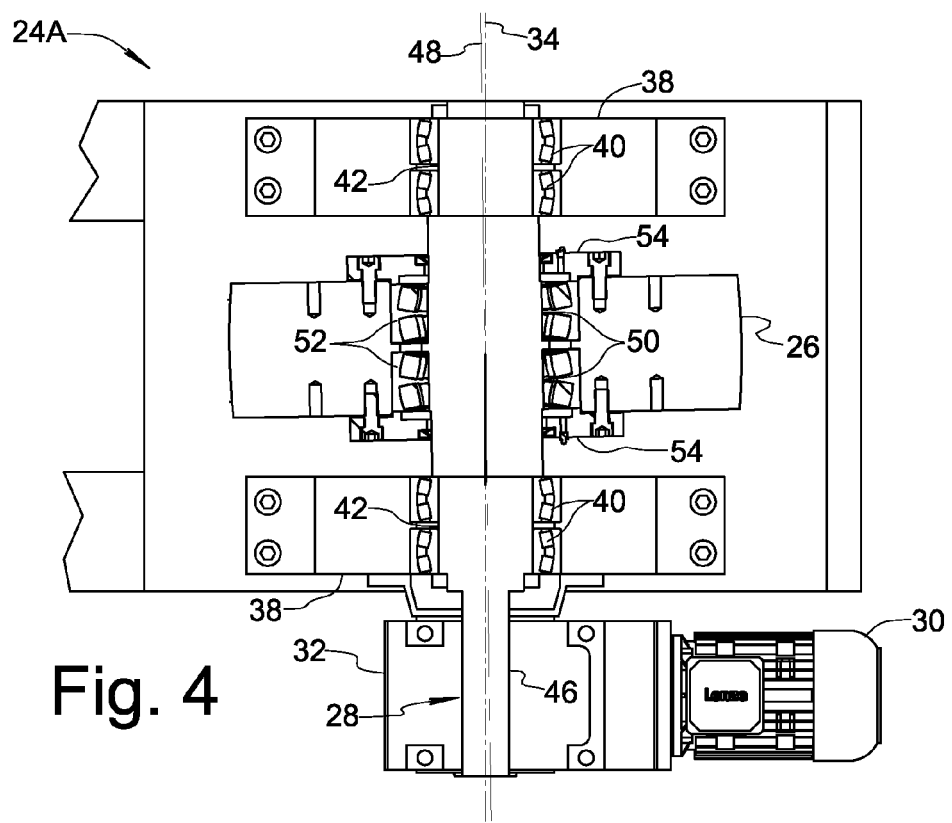

NEUTRAL POSITION

IDLER AXLE ROTATED
60 DEGREES CLOCKWISE

ANTI-DRIFT TURNING ROLL SYSTEM

FIELD OF THE INVENTION

The invention relates generally to turning roll systems for supporting and rotating cylindrical vessels. Such turning roll systems are commonly used during welding operations. The invention relates more particularly to an anti-drift device and method for opposing axial motion (axial drift; also known as axial creep) of a supported vessel or other workpiece as it is rotated.

BACKGROUND OF THE INVENTION

Turning roll systems of the type mentioned above generally comprise a pair of drive rollers spaced laterally from each other to frictionally engage opposite sides of a cylindrical workpiece at a first axial location, and a pair of idler rollers spaced laterally from each other to engage opposite sides of the workpiece at a second axial location spaced apart from the first axial location along an axis of rotation of the workpiece. The drive rollers are connected to a motor drive operable to rotate the drive rollers to thereby rotate the workpiece about its axis of rotation, referred to herein as the "workpiece axis." The idler rollers cooperate with the drive rollers to provide rolling support for the workpiece, but the idler rollers are not motor-driven. Typically, the drive rollers and idler rollers rotate about respective axes of rotation that are parallel to the workpiece axis. Due mainly to imperfections in the cylindrical shape of the workpiece, rotation of the workpiece about the workpiece axis may be accompanied by slight axial drift of the workpiece which can cause misalignment of weld seams.

Conventional anti-drift turning roll systems control the axial movement of the cylindrical workpiece or vessel by shifting the idler rollers vertically or horizontally in proportion to the amount of drift. This method is effective in controlling drift, but may result in significant vertical or horizontal movement of the workpiece which can interfere with the welding process.

Other anti-drift turning roll systems are based on adjusting the axis of rotation of one or more of the rollers to extend obliquely relative to the workpiece axis to introduce an axial force component counteracting the drift. Anti-drift turning roll systems of this type are summarized below.

U.S. Pat. No. 2,865,690 discloses a mechanically self-adjusting system wherein a pair of follower rollers 16 are arranged in abutment one with each end face of a tire 6 fitted around the circumference of the workpiece. The abutment follower rollers 16 are coupled by respective lever arms 15 to a trunnion bracket 9a supporting a roller 8 on one side of the workpiece. The trunnion bracket 9a is connected by a pair of parallel pivotal links 9b to an opposite side trunnion bracket 9a carrying a second roller 8 such that the two trunnion brackets 9a and two links 9b form a parallelogram linkage. When the workpiece is in a desired neutral axial position, the parallelogram linkage is in the form of a rectangle and the axes of rotation a-a of rollers 8 are parallel to the axis of rotation of the workpiece. When axial drift of the workpiece occurs as detected by follower rollers 16, the lever arms 15 transfer motion to the parallelogram linkage such that the rollers 8 and their rotational axes become angled obliquely with respect to the workpiece axis of rotation. A screw-thread effect returns the workpiece to its neutral axial position, and corresponding action of the follower rollers 16 and lever arms 15 returns the parallelogram linkage to its rectangular state.

British Patent No. 940,261 describes various embodiments. In an embodiment illustrated by FIG. 1, one of the four rollers 2 of the turning roll system can be turned by pivoting its sub-frame 4 about a vertical axis to adjust the axis of rotation of the roller 2 out of its neutral orientation parallel to the workpiece axis to an angled orientation nonparallel to the workpiece axis to counter axial drift. Another embodiment illustrated by FIGS. 2 and 3 works in a similar manner, wherein the axle 5 of a compensating roller 6 is mounted to pivot about a vertical axis. FIGS. 4 and 5 show a further embodiment wherein the axle 12 of a compensating roller 13 is mounted for pivotal motion about an axis defined by pivot pin 14 extending normal to the tangential plane at the point of contact between roller 13 and the workpiece. In this embodiment, the roller axis is parallel to the workpiece axis in a neutral configuration, and the roller axis may be pivoted in the tangential plane to be nonparallel to the workpiece axis for countering axial drift. FIG. 6 teaches another embodiment wherein a pair of rollers 25 on opposite sides of the workpiece are mounted on a common sub-frame 28 mounted for pivotal motion about a vertical pivot axis defined by pivot pin 29. The rotational axes of rollers 25 are parallel to the workpiece axis when the rollers 25 are in a neutral state, and the rotational axes of rollers 25 are adjusted to be nonparallel to the workpiece axis by pivoting the sub-frame 28 about pivot pin 29. Finally, an embodiment depicted in FIG. 7 teaches the use of abutment rollers 52 engaging end faces of the workpiece and coupled by a linkage 53 to pivot a sub-frame of compensating roller 50 about a vertical axis. Here again, the roller axis is parallel to the workpiece axis in a neutral state, and is urged out of parallel to counter axial drift of the workpiece.

British Patent No. 1,034,201 discloses an anti-drift adjustment mechanism wherein a trunnion bracket 12 carrying a pair of rollers 13 for engaging a side of the workpiece is pivotally mounted in a base or frame 10. The trunnion bracket 12 is coupled to a screw mechanism 20, 21, 22 such that rotation of the screw pivots the trunnion bracket 12 to adjust the roller axes slightly out of a neutral orientation parallel to the workpiece axis to an oblique orientation in which the rollers counteract axial drift of the workpiece.

British Patent No. 2,106,810 describes a turning roll system wherein a set of rollers 20 for engaging the workpiece is carried on a support 30 mounted to pivot about a generally vertical shaft 32 that is tilted laterally inward toward the workpiece. Rollers 20 rotate about axes that are parallel to the workpiece axis when the support 30 is in a neutral pivot position. A stylus 22 is biased to engage an end face of the workpiece to sense axial drift, and a signal indicative of axial drift is transmitted to electronic control means for operating a motor 44 and gearing to pivot support 30 about shaft 32 such that the roller axes are adjusted out of parallel with the workpiece axis to oppose the sensed axial drift.

U.S. Pat. No. 4,407,621 presents a turning roll system wherein three sets of rollers 24 are mounted on axially displaceable carriages 3, and a fourth set of rollers 24 is mounted on an axially fixable carriage. A mechanism 25, 27, 29 for each carriage 3 converts an axial movement of the carriage to a swivel movement of a roller holder 15, 20 on the carriage about a swivel axis 16 to adjust the roller axes out of a neutral orientation parallel to the workpiece axis to a drift counteracting orientation nonparallel to the workpiece axis.

While the solutions discussed above provide generally adequate results, they are mechanically complex. For example, the roller supports must be mounted to pivot about an axis that is vertical or generally vertical (inclined toward the workpiece), and a pivoting mechanism for the entire roller support must be provided.

In each case, the prior art solution provides a neutral orientation of the roller axes that is parallel to the workpiece axis.

It is also noted that none of the prior art systems discussed above pivots the roller support on one side of the workpiece in an opposite pivot direction from the roller support on the other side of the workpiece to impart additive axial force components to evenly oppose axial drift.

SUMMARY OF THE INVENTION

The present invention is based on the concept of adjusting the axis of rotation of one or more of the rollers to extend obliquely relative to the workpiece axis to introduce an axial force component counteracting the drift. However, the present invention provides an improved arrangement that is mechanically simpler and more effective compared to the systems discussed above.

A turning roll system formed in accordance with the present invention for rotating a cylindrical workpiece generally comprises a first motor drive; a pair of drive rollers operatively connected to the first motor drive to rotate the workpiece about a workpiece axis; and a pair of idler rollers spaced axially from the pair of drive rollers and arranged for frictional rolling engagement with the workpiece. At least one of the pair of idler rollers has an axis of rotation extending nonparallel to the workpiece axis at all times, and such idler roller is supported by a respective idler axle that is pivotable to adjust orientation of the axis of rotation of such idler roller. The pivot axis of the idler axle may extend parallel to the workpiece axis. In an embodiment of the present invention, each of the pair of idler rollers has an axis of rotation extending nonparallel to the workpiece axis at all times, and each of the pair of idler axles is pivotable about a respective pivot axis extending parallel to the workpiece axis.

The turning roll system of the present invention may further comprise a second motor drive for pivoting the pair of idler axles to adjust the orientation of the idler roller axes, a drift sensor arranged to detect axial drift of the workpiece and generate a drift signal representing direction and magnitude of sensed axial drift, and a controller for issuing drive commands to the second motor drive based on the drift signal. In this manner, a feedback control loop is established whereby axial drift is minimized by continually and automatically adjusting the axes of rotation of the idler rollers.

The invention also encompasses a method of opposing axial drift of a cylindrical workpiece as the workpiece is rotated about a workpiece axis by a turning roll system. The method is based on adjusting the orientation of the idler roller axes relative to the workpiece axis by pivoting the idler axles on which the idler rollers are journalled.

BRIEF DESCRIPTION OF THE DRAWINGS

The invention is described in detail below with reference to the following figures:

FIG. 3 is a top plan view of the turning roll system and workpiece shown in

FIG. 1;

FIG. 4 is an enlarged top plan view of a single idler roller assembly of the turning roll system shown in FIG. 1;

DETAILED DESCRIPTION OF THE INVENTION

Figure 1:
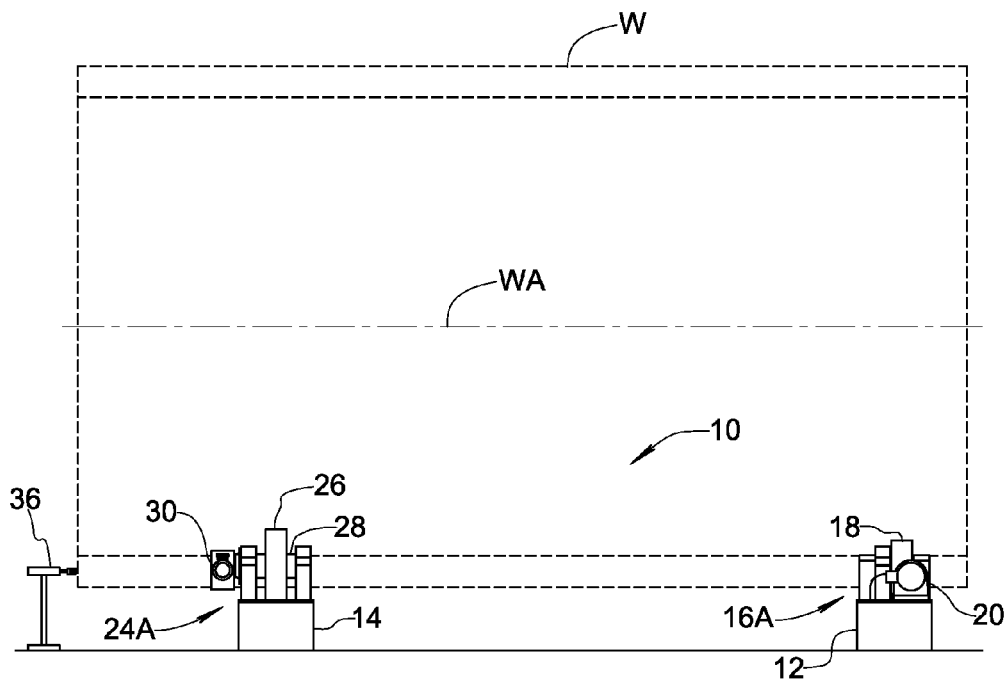
FIG. 1 is a side view of a turning roll system formed in accordance with an embodiment of the present invention, wherein the turning roll system is shown supporting a cylindrical workpiece.
Figure 2:
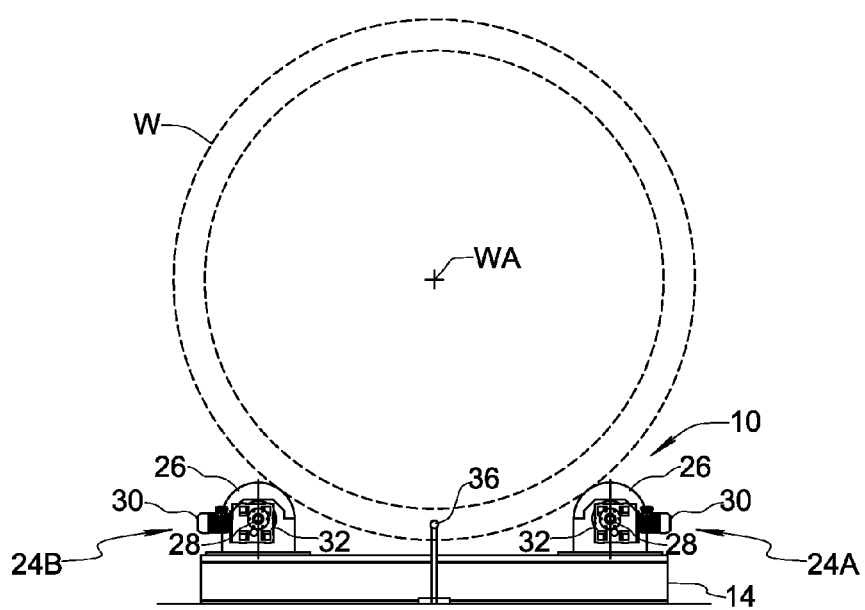
FIG. 2 is an end view of the turning roll system and workpiece shown in FIG. 1.

Reference is made initially to FIGS. 1-3 of the drawings, wherein a turning roll system formed in accordance with an embodiment of the present invention is identified generally by the reference numeral 10. Turning roll system 10 is intended to support a cylindrical workpiece W and rotate the workpiece about a workpiece axis WA. The workpiece W is not considered a part of the present invention.

Turning roll system 10 comprises a drive stand 12 and an idler stand 14 spaced apart from each other along workpiece axis WA. As best seen in FIG. 3, drive stand 12 supports a first drive roller assembly 16A and a second drive roller assembly 16B arranged symmetrically on opposite sides of workpiece axis WA. Each drive roller assembly 16A, 16B includes a drive roller 18 for frictionally engaging an outer cylindrical surface of workpiece W, a drive motor 20, and a transmission 22 connecting the drive motor 20 to the drive roller 18, whereby operation of drive motor 20 drives rotation of drive roller 18 to cause workpiece W to rotate about workpiece axis WA. The pair of drive motors 20 provided by assemblies 16A and 16B are collectively referred to herein as "a first motor drive." Those skilled in the art will realize that a single drive motor could be provided and linked to both drive rollers 18 on assemblies 16A and 16B by a suitable transmission mechanism, and such a single motor drive would also be considered "a first motor drive" in accordance with the present invention.

Idler stand 14 supports a first idler roller assembly 24A and a second idler roller assembly 24B arranged symmetrically on opposite sides of workpiece axis WA. Each idler roller assembly 24A, 24B includes an idler roller 26 for frictionally engaging the outer cylindrical surface of workpiece W, an idler axle 28 on which the idler roller 26 is rotatably journalled in novel fashion as will be described in detail with reference to FIG. 4, an idler adjustment motor 30, and a transmission 32 connecting the idler adjustment motor 30 to the idler roller 26, whereby operation of idler adjustment motor 30 pivots the associated idler axle 28 about a central pivot axis of 34 of the idler axle. The pair of idler adjustment motors 30 provided by assemblies 24A and 24B are collectively referred to herein as "a second motor drive." Those skilled in the art will realize that a single drive motor could be provided and linked to both idler axles on assemblies 24A and 24B by a suitable transmission mechanism, and such a single motor drive would also be considered "a second motor drive" in accordance with the present invention.

Turning roll system 10 further comprises a drift sensor 36 arranged and biased to continuously engage an end face of workpiece W, or a guide ring provided around the circumference of workpiece W, for detecting axial displacement (drift) of the workpiece from a reference position and generating a drift signal indicating the magnitude and direction of the detected axial drift. Drift sensor 36 may take the form of any suitable linear displacement sensor. By way of non-limiting example, drift sensor 36 may be a linear encoder, linear transducer, linear potentiometer, fiber-optic displacement sensor, laser displacement sensor, LVDT displacement transducer, magnetic scale sensor, or the like. Because workpiece W is rotated by turning roll system 10, and a contact tip of drift sensor 36 engages a surface at a location spaced radially from workpiece axis WA, the contact tip of drift sensor 36 may be designed for low friction contact with the end face of workpiece W to minimize wear. For example, a roller may be used as the contact tip of drift sensor 36.

Attention is now directed to FIG. 4 of the drawings, wherein a detailed sectional view of idler roller assembly 24A is shown, it being understood that idler roller assembly 24B is a mirror image of idler roller assembly 24A. Idler axle 28 is pivotably supported in blocks 38 by a pair of rotary bearings 40 each receiving a reduced-diameter outer journal 42 of idler axle 28, such that idler axle 28 is pivotable about its central pivot axis 34. Idler adjustment motor 30 is coupled through transmission 32 to a reduced-diameter input portion 46 of idler axle 28, such that idler adjustment motor is operable to pivot idler axle 28 in opposite pivot directions about pivot axis 34. As in the embodiment shown, pivot axis 34 of idler axle 28 may extend parallel to workpiece axis WA.

In accordance with the present invention, idler roller 26 is journalled on idler axle 28 to rotate about an axis 48 that does not coincide with the pivot axis 34 of idler axle 28. The rotational axis 48 of idler roller 26 may be slightly angled relative to pivot axis 34 of idler axle 28. In the embodiment shown, idler axle 28 includes inner cylindrical journals 50 machined to define the rotational axis 48 of idler roller 26. Idler roller axis 48 may extend such that it intersects pivot axis 34 of idler axle 28 at a radial and axial center point of idler roller 26. Idler roller 26 is rotatably mounted on inner journals 50 for rotation about axis 48 by rotary bearings 52 confined by a pair of opposing end plates 54. Thus, roller axis 48 may form a non-zero offset angle with pivot axis 34. By way of non-limiting example, roller axis 48 may form a small offset angle of about one degree with pivot axis 34.

Figure 5A:
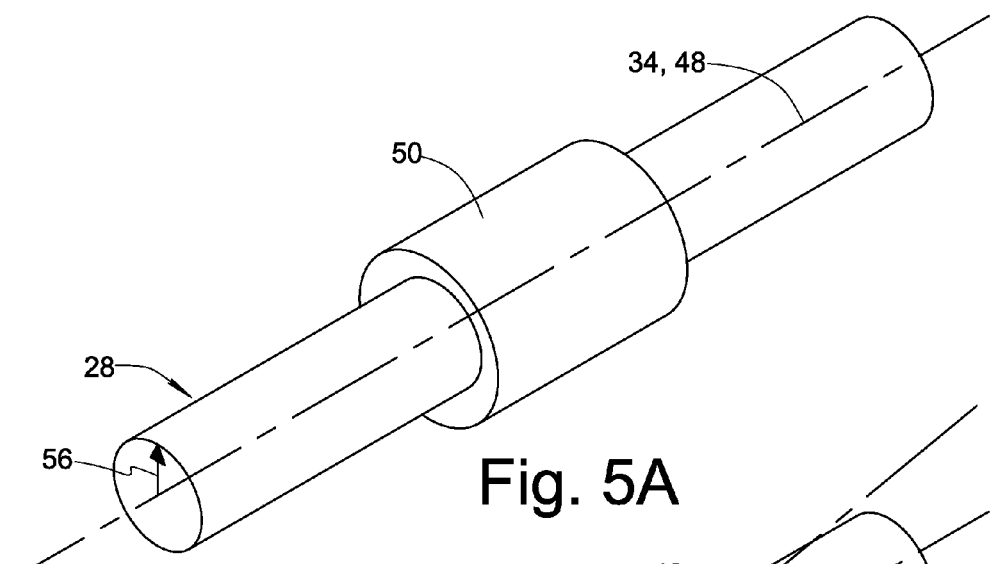
FIG. 5A is a schematic perspective view illustrating a neutral pivot position of an idler axle of the turning roll system.
Figure 5B:
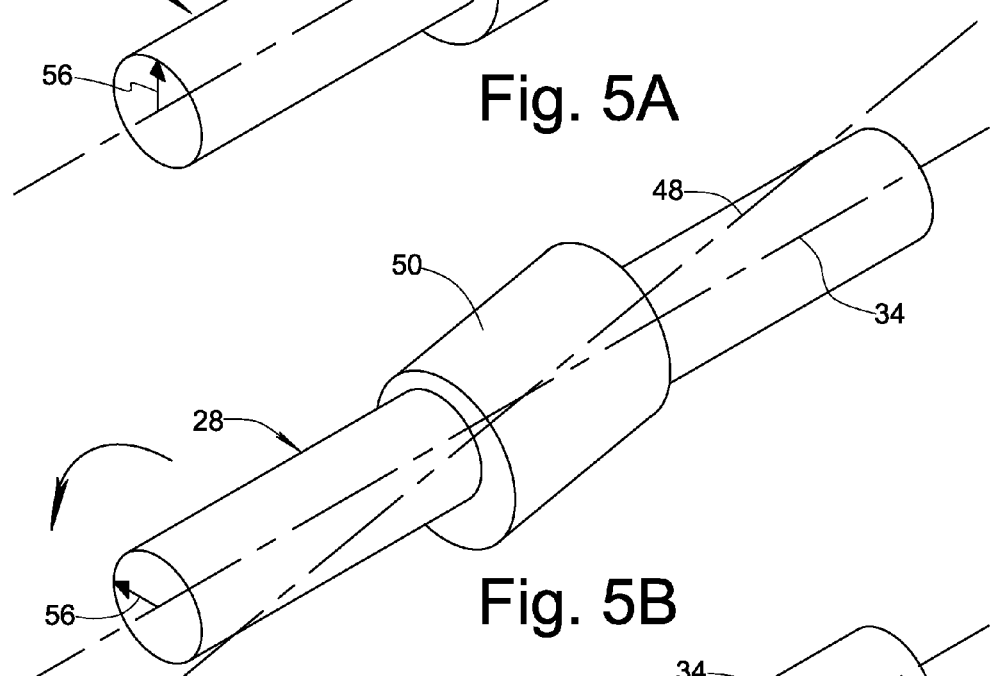
FIG. 5B is a view similar to that of FIG. 5A, wherein the idler axle is shown pivoted in a first pivot direction away from the neutral pivot position.
Figure 5C:
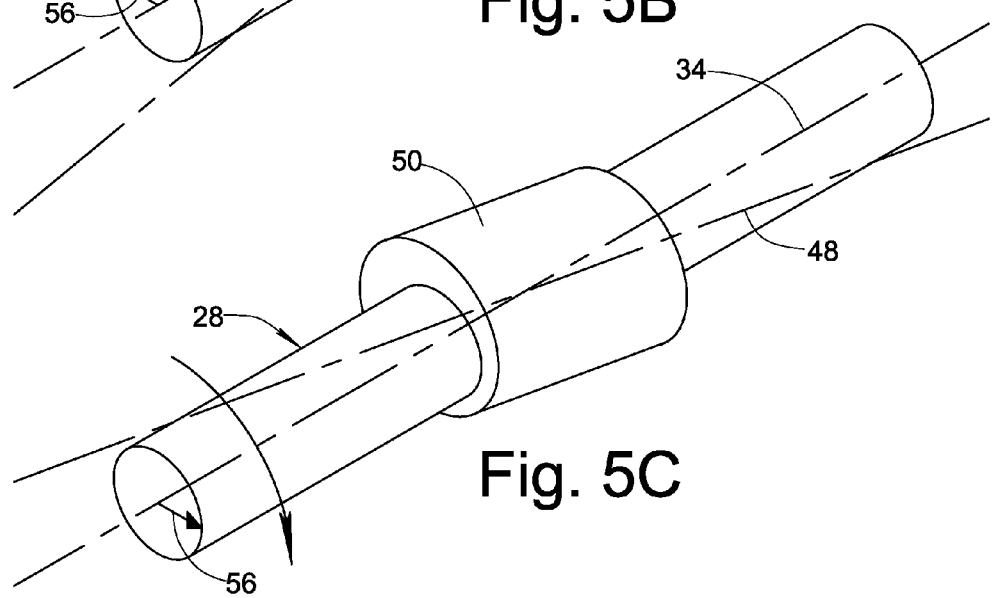
FIG. 5C is a view similar to that of FIG. 5A, wherein the idler axle is shown pivoted in a second pivot direction away from the neutral pivot position.

The effect of mounting idler roller 26 on idler axle 28 in the manner described above may be understood by reference to FIGS. 5A-5C, in which the offset angle between the rotational axis 48 of idler roller 26 and pivot axis 34 of idler axle 28 is exaggerated for sake of illustration. A reference arrow 56 is provided on the schematic representation of idler axle 28 to indicate a pivot position of idler axle 28 about pivot axis 34. In the view of FIG. 5A, reference arrow 56 points directly upward and axes 34 and 48 appear to coincide, however the axes do not actually coincide. When idler axle 28 is pivoted ninety degrees counter-clockwise about pivot axis 34 from the pivot position in FIG. 5A, as now shown in FIG. 5B, the relationship between offset journal 50 and the remainder of idler axle 28 becomes apparent. Pivoting idler axle 28 about pivot axis 34 adjusts the orientation of rotational axis 48 while the orientation of axis 34 remains unchanged. Likewise, when idler axle 28 is pivoted ninety degrees clockwise about pivot axis 34 from the neutral pivot position in FIG. 5A, as illustrated in FIG. 5C, the orientation of rotational axis 48 is adjusted in an opposite manner as compared to FIG. 5B.

Figure 6A:
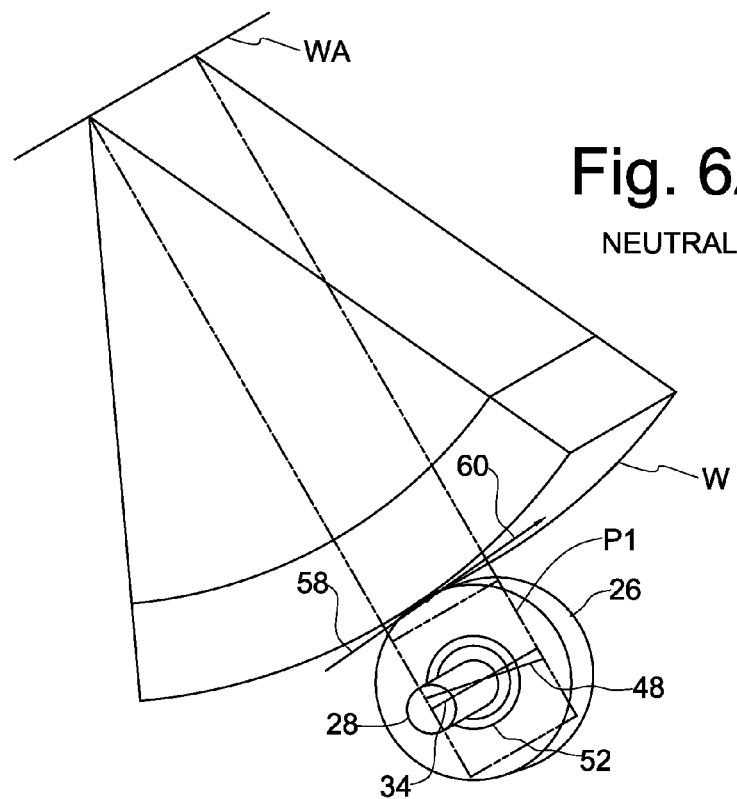
FIG. 6A is a schematic perspective view corresponding to the neutral pivot position of an idler axle, wherein the axis of rotation of the idler roller is coplanar with the axis of rotation of a cylindrical workpiece.
Figure 6B:
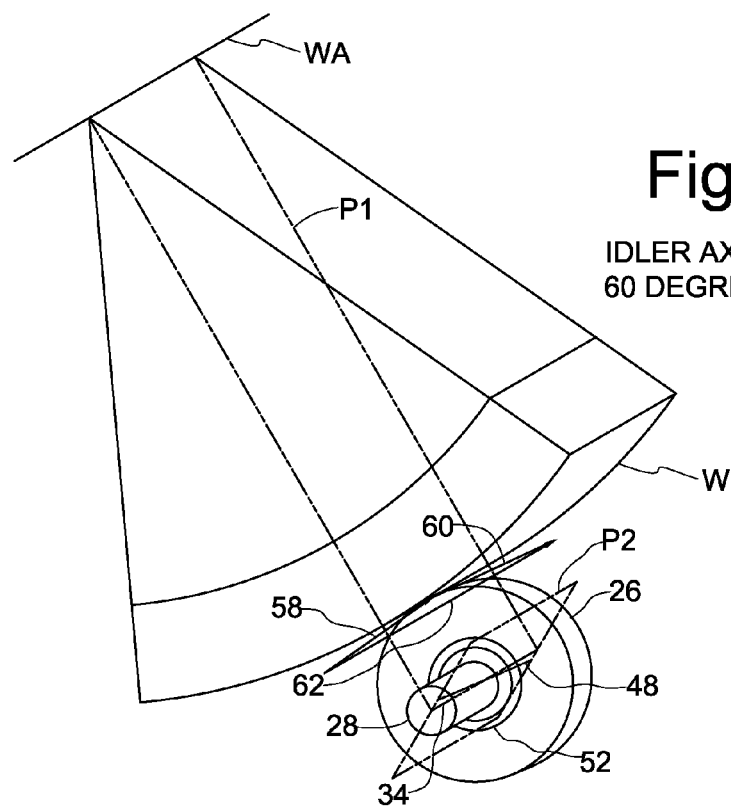
FIG. 6B is a view similar to that of FIG. 6A but corresponding to a non-neutral pivot position of the idler axle, wherein the axis of rotation of the idler roller is not coplanar with the axis of rotation of a cylindrical workpiece.

FIGS. 6A and 6B schematically represent how idler axle 28 can be arranged relative to workpiece W and pivoted about axis 34 to adjust the orientation of idler roller axis 48 to achieve both a neutral relationship with workpiece W wherein no axially-directed force component is present (FIG. 6A), and an anti-drift relationship with workpiece W wherein an axially-directed force component is introduced to counter axial drift of the workpiece (FIG. 6B). In FIG. 6A, pivot axis 34 is parallel to workpiece axis WA and coplanar with workpiece axis WA in a plane P1. Moreover, rotational axis 48 of idler roller 26 is nonparallel to workpiece axis WA and pivot axis 34, but is coplanar with workpiece axis WA and pivot axis 34 in plane P1. In this pivot position of idler axle 28, the workpiece rotation vector 58 and idler roller rotation vector 60 both extend perpendicular to their respective axes WA and 48 and normal to common plane P1, and there is no net axial force component imparted by roller 26 to workpiece W. Thus, even with roller axis 48 being nonparallel to workpiece axis WA, a neutral state is achieved. This is in contrast to all known prior art systems, wherein the rotational axis of the roller is oriented parallel to the workpiece axis to achieve a neutral state.

In FIG. 6B, idler axle 28 is pivoted about pivot axis 34, thereby adjusting rotational axis 48 of idler roller 26 to an orientation in which axis 48 is not coplanar with workpiece axis WA. This can be seen by the fact that pivot axis 34 and workpiece axis WA remain coplanar with each other in plane P1, while pivot axis 34 and rotational axis 48 are coplanar with each other in a different plane P2. As a consequence, the workpiece rotation vector 58 remains perpendicular to plane P1 but roller rotation vector 60 is tilted slightly in an axial direction such that the resultant vector 62 includes a small axial component. The axial force component may be used to counter axial drift. In this regard, the direction of the axial force component can be controlled by choosing the pivot direction of idler axle 28. The magnitude of the axial force component increases in proportion to the pivotal displacement of idler axle 28 from the neutral pivot position, and reaches a maximum when idler axle 28 is pivoted ninety degrees from the neutral pivot position in either pivotal direction. The magnitude of the axial force on the workpiece also depends on the coefficient of friction between workpiece W and idler roller 26, and on the distribution of the workpiece weight between drive rollers 18 and idler rollers 26.

In theory, the anti-drift mechanism of turning roll system 10 will work for all coefficients of friction so long as the same coefficient applies to drive rollers 18 and idler rollers 26. The anti-drift mechanism will work for all workpiece weight distributions between drive rollers 18 and idler rollers 26 as long as the angle of the resultant vector 62 is greater than the maximum misalignment of workpiece axis WA and idler roller axis 48. Nevertheless, it is recognized that the anti-drift mechanism will be less responsive as more of the workpiece weight is shifted from idler rollers 26 to drive rollers 18.

By way of example, for a turning roll system 10 operating under the specifications for roller alignment, workpiece straightness, and workpiece roundness set forth in Table 1, it is recommended that more than 50% of the workpiece weight be supported by idler rollers 26, and more particularly that about 60% of the workpiece weight be supported by idler rollers 26 and about 40% of the workpiece weight be supported by drive rollers 18.

TABLE 1

| | |
|---|---|
| Drift control range | +/−1 mm |
| Drift sensor contact surface | Parallel to weld joint within 1 mm |
| Drive and idler roller alignment | Horizontally and vertically aligned within 1 mm/m of separation distance along workpiece axis |
| Workpiece diameter | Straight within 2 mm/m of length |
| Workpiece roundness | Workpiece must be smooth and round within 1 mm/m of diameter at the roller contact surfaces |

Based on the above specifications, a maximum initial misalignment of the workpiece and rollers is anticipated to be 0.3 degrees. Under these parameters, a setup distributing 40% of the workpiece weight on drive rollers 18 and 60% of the workpiece weight on idler rollers 26 will mean that the idler axles 28 will be required to pivot about +/−45 degrees from neutral to compensate for the maximum anticipated initial misalignment of 0.3 degrees; the remaining 45 degrees of pivot range in each pivot direction is available for anti-drift adjustment or compensation for other factors.

Figure 7:
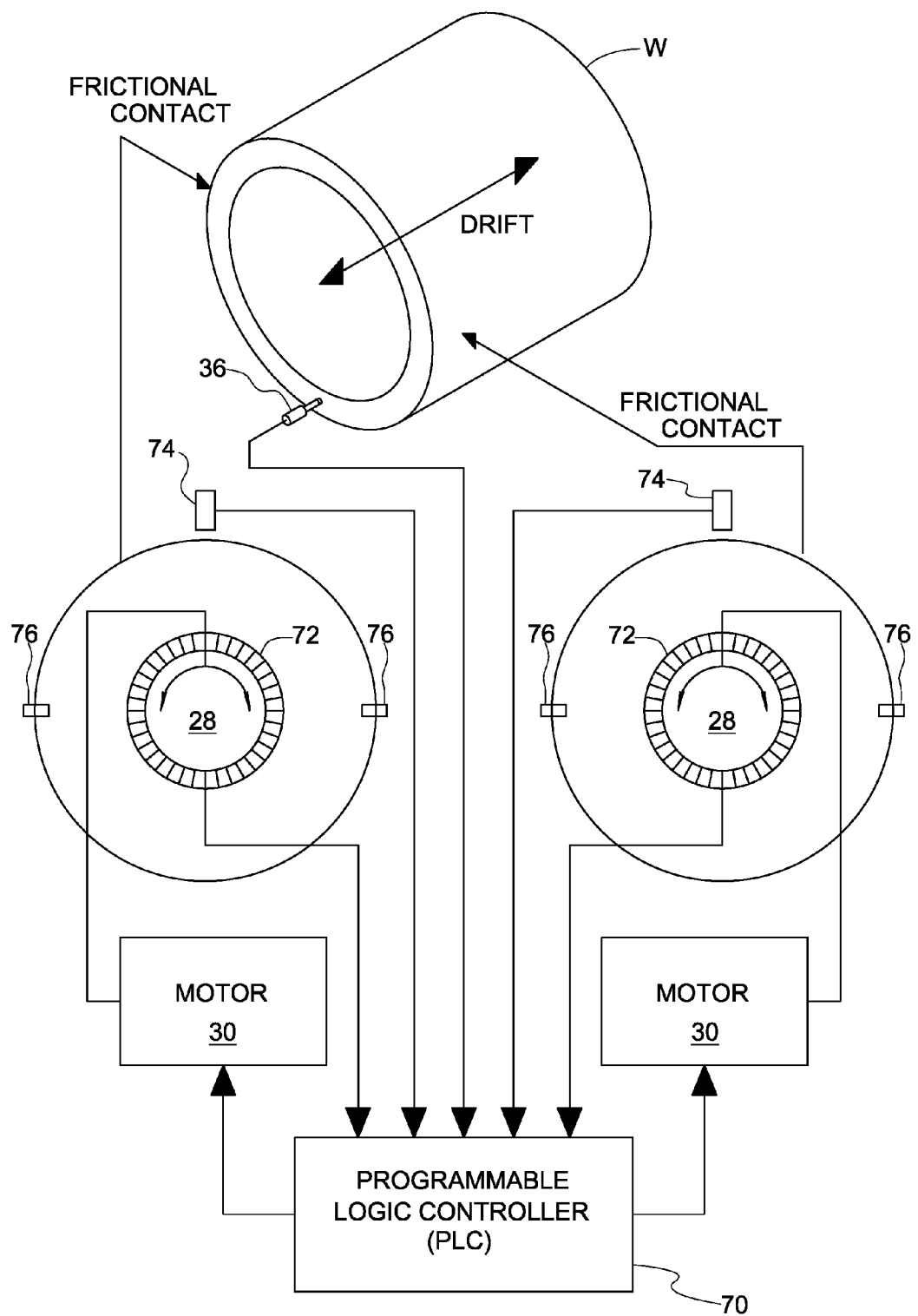
FIG. 7 is a schematic diagram showing a closed-loop feedback control system for pivoting a pair of idler axles of the turning roll system to counter sensed axial drift.

Pivotal adjustment of idler axles 28 for countering axial drift may be carried out automatically using a closed loop control system for controlling idler adjustment motors 30. An example embodiment of such a control system is schematically represented in FIG. 7. A programmable logic controller (PLC) 70 is connected to each idler adjustment motor 30 to provide drive commands to motors 30 for adjusting the pivot position of each idler axle 28. A rotary encoder 72 associated with each idler axle 28 provides a pivot position signal as input to PLC 70 to indicate the pivot position of the associated idler axle. Alternatively, a rotary position sensor could be incorporated into each idler adjustment motor to provide a pivot position signal. Also inputted to PLC 70 is the drift signal generated by drift sensor 36. A limit switch 74 may also be provided for cooperation with a pair of limit tabs 76 arranged to define a maximum pivot range in opposite pivot directions from a neutral pivot position. In FIG. 7, the limit tabs allow idler axle 28 to pivot ninety degrees in either pivot direction before actuating limit switch 74 to halt corresponding motor 30. Of course, limit tabs 76 may be arranged provide other ranges of pivotal motion of idler axle 28. PLC may be programmed to drive idler adjustment motors 30 to pivot idler axles 28 to adjust orientation of idler roller axes 48 such that the drift signal from drift sensor 36 will be minimized. Due to the mirror image relationship of idler roller assemblies 24A and 24B, idler axles 28 may be pivoted in opposite pivot directions (e.g. one clockwise and the other counterclockwise) to achieve an additive anti-drift effect that is evenly distributed on opposite sides of the workpiece.

It will be understood from the foregoing description that the invention encompasses a method of opposing axial drift of a cylindrical workpiece as the workpiece is rotated about a workpiece axis by a turning roll system. The method generally comprises the steps of arranging a pair of idler rollers in supporting engagement with the workpiece, wherein each of the pair of idler rollers has an axis of rotation extending nonparallel to the workpiece axis at all times; and orienting the axes of rotation of the pair of idler rollers such that the pair of idler rollers impart an axially-directed force component to the workpiece. The method may further comprise the step of detecting magnitude and direction of axial drift of the workpiece, wherein the step of orienting the axes of rotation of the pair of idler rollers is determined by the detected magnitude and direction of axial drift and may be carried out by pivoting a pair of idler axles respectively supporting the pair of idler rollers. In this regard, a closed loop feedback control system may be used. As evidenced by the embodiment described herein, each of the pair of idler axles may be pivoted about a respective pivot axis that extends parallel to the workpiece axis. The method of opposing axial drift according to the present invention may also include arranging the pair of idler rollers to support a majority of the weight of the workpiece.

What is claimed is:

1. A turning roll system for rotating a cylindrical workpiece, the turning roll system comprising:
   a first motor drive;
   a pair of drive rollers operatively connected to the first motor drive, the pair of drive rollers being spaced laterally from one another and arranged for frictional rolling engagement with the workpiece to cause the workpiece to rotate about a workpiece axis;
   a pair of idler rollers spaced axially from the pair of drive rollers and arranged for frictional rolling engagement with the workpiece, at least one of the pair of idler rollers having an axis of rotation extending nonparallel to the workpiece axis; and
   a pair of idler axles respectively supporting the pair of idler rollers, at least one of the pair of idler axles being pivotable about a pivot axis of the idler axle to adjust orientation of the axis of rotation of the idler roller supported thereby;
   wherein the axis of rotation of the at least one idler roller remains nonparallel to the workpiece axis in all possible adjustment orientations.

2. The turning roll system according to claim 1, wherein the pivot axis of the at least one idler axle extends parallel to the workpiece axis.

3. The turning roll system according to claim 2, wherein the pivot axis of the at least one idler axle forms a non-zero offset angle with the axis of rotation of the idler roller supported thereby.

4. The turning roll system according to claim 3, wherein the non-zero offset angle is about one degree.

5. The turning roll system according to claim 1, wherein each of the pair of idler rollers has an axis of rotation extending nonparallel to the workpiece axis in all possible adjustment orientations.

6. The turning roll system according to claim 5, wherein each of the pair of idler axles is pivotable about a pivot axis extending parallel to the workpiece axis.

7. The turning roll system according to claim 5, wherein each of the pair of idler axles has a neutral pivot position in which the axis of rotation of the idler roller supported thereby is oriented to be coplanar with the workpiece axis.

8. The turning roll system according to claim 7, wherein each of the pair of idler axles is pivotable in a first pivot direction from the neutral pivot position to orient the axis of rotation of the idler roller supported thereby to be non-coplanar with the workpiece axis such that the idler roller imparts a force component to the workpiece in a first axial direction, and is pivotable in a second pivot direction from the neutral pivot position to orient the axis of rotation of the idler roller supported thereby to be non-coplanar with the workpiece axis such that the idler roller imparts a force component to the workpiece in a second axial direction opposite to the first axial direction.

9. The turning roll system according to claim 8, further comprising:
   a second motor drive connected to the pair of idler axles, wherein the second motor drive is operable to pivot each of the pair of idler axles; and a controller connected to the second motor drive for issuing control commands to the second motor drive to pivot the pair of idler axles.

10. The turning roll system according to claim 9, further comprising a drift sensor arranged to detect axial drift of the workpiece and generate a drift signal indicating magnitude and direction of the detected axial drift, the drift signal being inputted to the controller, wherein the controller is programmed to command the second motor drive in response to the drift signal to pivot the pair of idler axles so as to reduce the magnitude of the detected axial drift.

11. In a turning roll system having a pair of powered drive rollers cooperating with a pair of idler rollers to support a cylindrical workpiece, the pair of drive rollers being operable to impart torque to the workpiece to rotate the workpiece about a workpiece axis, the improvement comprising:
 a pair of idler axles each pivotable about a respective pivot axis extending parallel to the workpiece axis; and
 the pair of idler rollers each journalled on a respective one of the pair of idler axles for rotation about an axis forming a non-zero offset angle with the pivot axis of the associated idler axle.

12. The improvement according to claim 11, wherein the non-zero offset angle is about one degree.

13. The improvement according to claim 11, wherein each of the idler axles has a neutral pivot position in which the axis of rotation of the idler roller supported thereby is oriented to be coplanar with the workpiece axis.

14. The improvement according to claim 13, wherein each of the idler axles is pivotable about its pivot axis in a first pivot direction from the neutral pivot position to orient the axis of rotation of the idler roller supported thereby to be non-coplanar with the workpiece axis such that the idler roller imparts a force component to the workpiece in a first axial direction, and is pivotable in a second pivot direction about its pivot axis from the neutral pivot position to orient the axis of rotation of the idler roller supported thereby to be non-coplanar with the workpiece axis such that the idler roller imparts a force component to the workpiece in a second axial direction opposite to the first axial direction.

15. The improvement according to claim 11, further comprising:
 a motor drive connected to each of the idler axles, wherein the motor drive is operable to pivot each of the idler axles about its pivot axis; and a controller connected to the motor drive for issuing control commands to the motor drive to pivot the pair of idler axles.

16. The improvement according to claim 15, further comprising a drift sensor arranged to detect axial drift of the workpiece and generate a drift signal indicating magnitude and direction of the detected axial drift, the drift signal being inputted to the controller, wherein the controller is programmed to command the motor drive in response to the drift signal to pivot the idler axles so as to reduce the magnitude of the detected axial drift.

17. A method of opposing axial drift of a cylindrical workpiece as the workpiece is rotated about a workpiece axis by a turning roll system, the method comprising the steps of:
 arranging a pair of idler rollers in supporting engagement with the workpiece, wherein each of the pair of idler rollers has an axis of rotation extending nonparallel to the workpiece axis at all times; and
 orienting the axes of rotation of the pair of idler rollers such that the pair of idler rollers impart an axially-directed force component to the workpiece.

18. The method according to claim 17, further comprising the step of detecting magnitude and direction of axial drift of the workpiece, wherein the step of orienting the axes of rotation of the pair of idler rollers is determined by the detected magnitude and direction of axial drift.

19. The method according to claim 17, wherein the step of orienting the axes of rotation of the pair of idler rollers is carried out by pivoting a pair of idler axles respectively supporting the pair of idler rollers.

20. The method according to claim 19, wherein each of the pair of idler axles is pivoted about a respective pivot axis that extends parallel to the workpiece axis.

21. The method according to claim 17, wherein the step of arranging a pair of idler rollers in supporting engagement with the workpiece includes positioning the pair of idler rollers to support a majority of the weight of the workpiece.

\* \* \* \* \*